United States Patent Office 3,372,904
Patented Mar. 12, 1968

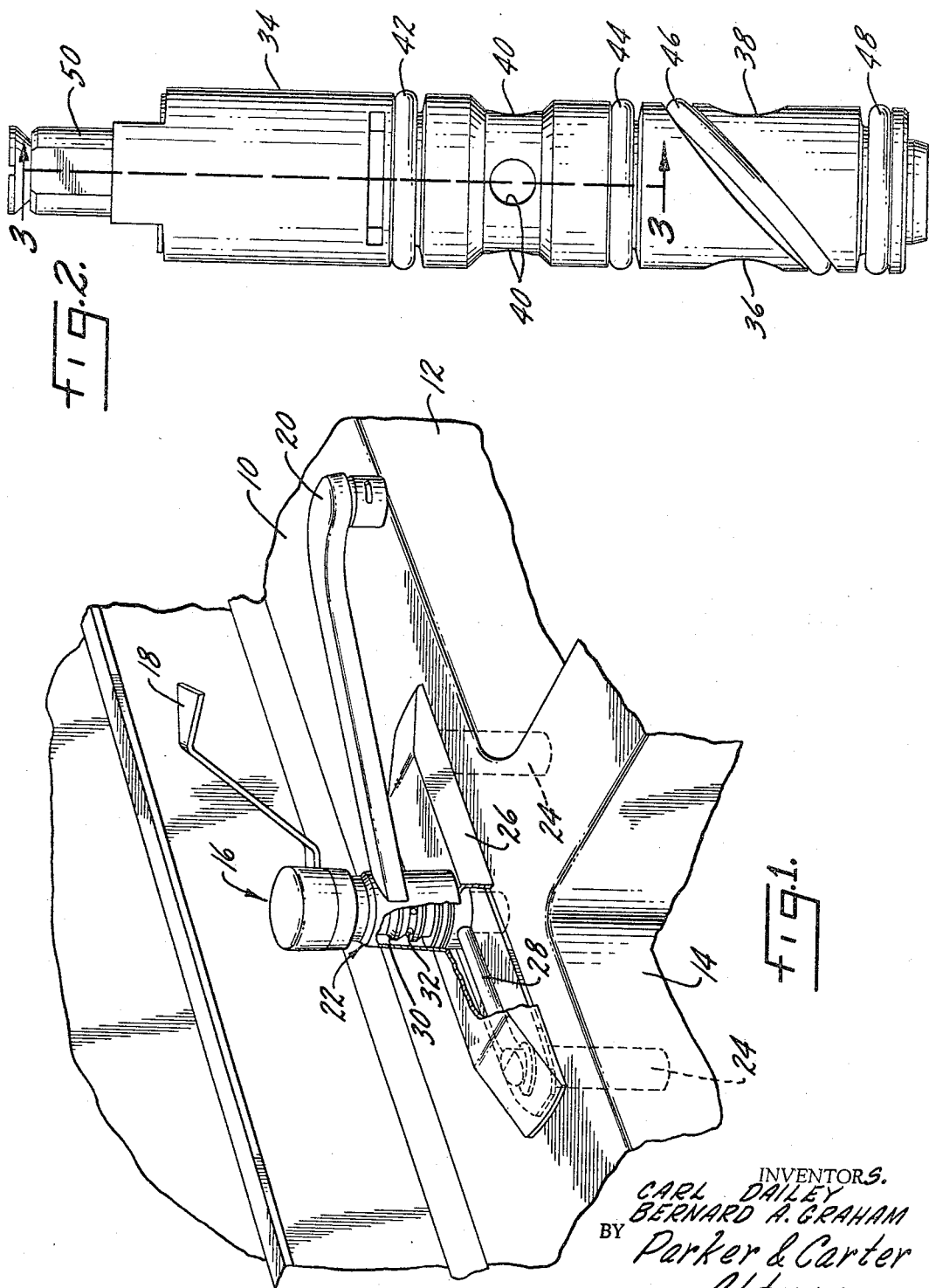

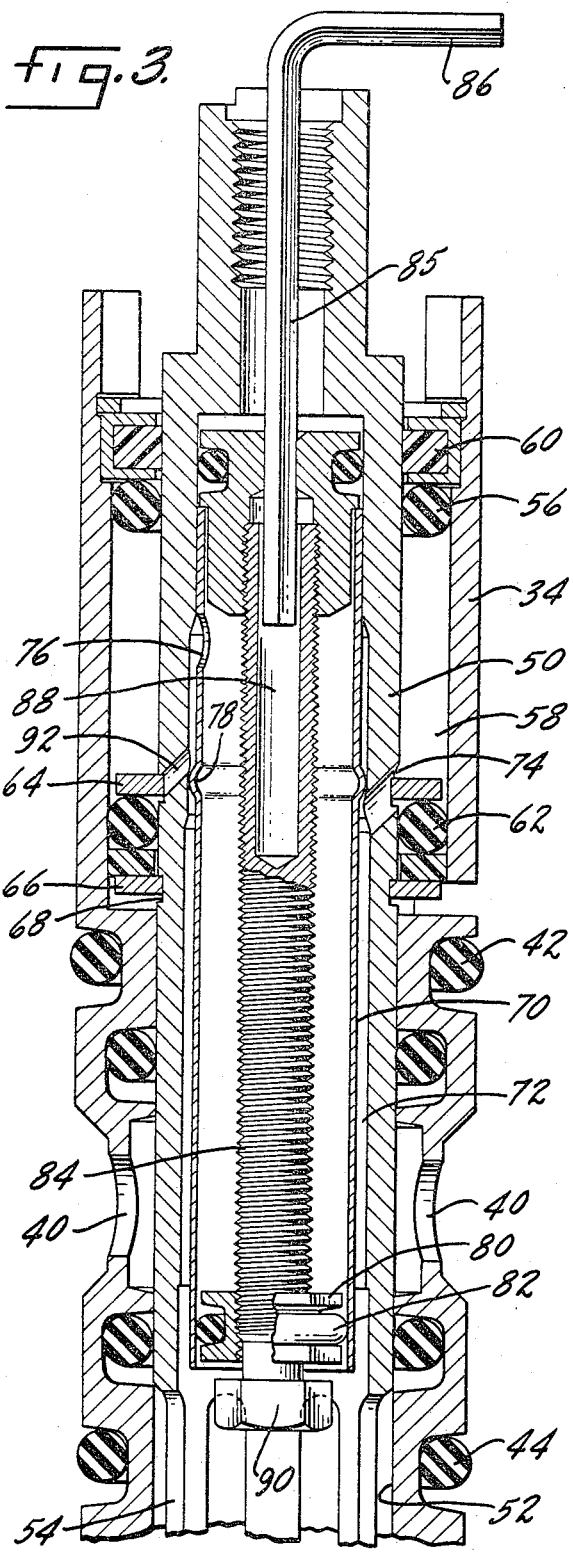

3,372,904
WATER FAUCET VALVE MEANS CONTAINING A LUBRICANT
Bernard A. Graham, Phoenix, Ariz., and Carl Dailey, Covina, Calif., assignors to Standard Screw Company, Bellwood, Ill., a corporation of New Jersey
Filed Aug. 28, 1964, Ser. No. 392,814
3 Claims. (Cl. 251—355)

ABSTRACT OF THE DISCLOSURE

A hot and cold water faucet type mixing valve having a self-contained lubricant chamber within the valve member which is slidable relative to its valve housing. Lubricant is forced out of the chamber to lubricate the seals between the valve member and valve housing by a piston in the lubricant chamber, the piston being actuatable from outside the valve without disassembling the interior of the valve.

---

This invention relates to water faucet assemblies and in particular to a valve for use therein which contains a source of lubricant utilized in lubricating one or more of the seal rings within the valve.

A primary purpose of the invention is a valve of the type described which includes a source of lubricant with means outside of the valve or exterior to it for forcing lubricant from the source to a point where it is used on one or more of the valve seal rings.

Another purpose is a water faucet valve of the type described including means for periodic lubrication by the valve user.

Another purpose is a valve cartridge for insertion within a water faucet housing, which valve cartridge contains all of the operating and wear parts for controlling the volume and temperature of the water through the faucet as well as a source of lubricant for use in periodic lubrication of the valve seal members.

Other purposes will appear in the ensuing specification, drawings and claims.

The invention is illustrated diagrammatically in the following drawings wherein:

FIGURE 1 is a perspective, with portions cut away, of a water faucet housing,

FIGURE 2 is a side elevation of a valve cartridge of the type described,

FIGURE 3 is an enlarged axial section along plane 3—3 of FIGURE 2, and

Figure 4:
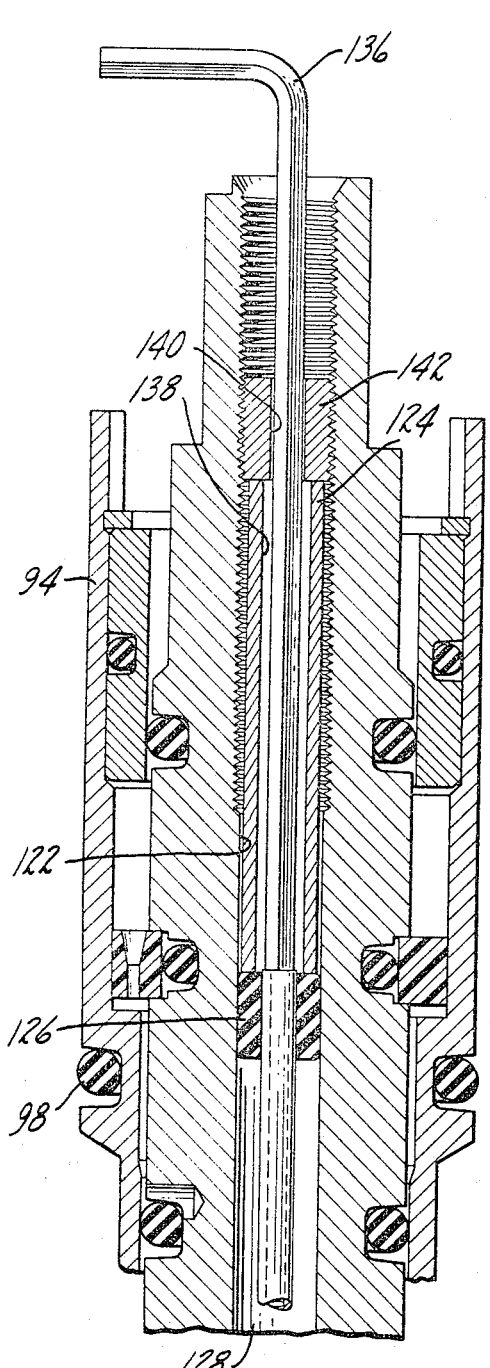
FIGURES 4 and 5 are enlarged axial sections through a modified valve cartridge, with FIGURE 4 being the top half of the cartridge, and FIGURE 5 being the bottom half.

In FIGURE 1 the baseboard of a sink is indicated at 10, and there are sink areas 12 and 14 on either side of a water faucet indicated generally at 16. As shown herein, the water faucet is of the single lever type with a single handle 18, which is effective to control both the volume and temperature of the water. There is a spout 20 which directs water to either one of the sink basins. The faucet housing is indicated generally at 22 and contains an operating valve which will be described in detail hereinafter. Hot and cold water inlet pipes are indicated at 24 and 24, with these inlet pipes being connected to faucet base 26 having water passages, such as passage 28, which convey the hot and cold water to the faucet valve. Within the housing 22, which may be considered an outer shell, is a housing 30 for the valve proper. The housing 30 has outlets 32 which direct water from the interior valve to the spout 20.

The valve for controlling the volume and temperature of the water may be of the type shown in U.S. Patent 3,103,231, or it may be otherwise. A valve cartridge of the type shown in said patent may include an outer sleeve 34 having hot and cold water inlet ports 36 and 38 which are in communication with the hot and cold inlets 24, as shown in FIGURE 1, through passages 28. The sleeve 34 has a plurality of outlet ports 40 spaced from the inlet ports and positioned to discharge water through ports 32 indicated in the housing. There are a number of seal rings positioned along the length of the sleeve, and beginning at the top, these seal rings are indicated at 42, 44, 46 and 48. The purpose and operation of each of these seal rings are described in the above-mentioned patent.

Positioned within sleeve 34 is a movable valve member or stem 50, which has a lower opening, not shown, which can be placed in communication with the hot and cold water inlet ports to permit water to enter into the hollow interior 52 of the valve member. The valve member 50 may have outlets 54 which may be placed in communication with the outlets 40 for discharging mixed hot and cold water. The valve 50 is normally rotated and reciprocated by manipulation of handle 18, shown in FIGURE 1, to control the volume and temperature of the water discharged through the spout 20.

Positioned between the exterior of the valve member 50 and the interior of the sleeve 34, at the upper end of the valve, is a seal ring 56, which seals the upper end of a water chamber 58. The seal ring 56 is held in position on the top side by retaining member 60. The lower end of the water chamber 58 is sealed by a second seal ring 62, held in position between snap rings 64 and 66, which are fastened in notches 68 in the exterior of the valve member 50. Seal ring 56 prevents water from reaching the exterior of the valve and the exterior of the faucet housing. Both seal rings 56 and 62 bear against the exterior of valve member 50. It is the principal purpose of the present invention to keep these rings lubricated to permit the valve member to be easily manipulated for control of the volume and temperature of the water. Without lubrication these rings will resist outward movement of the valve member to a point where it may be difficult to operate the valve.

Positioned within the hollow interior of the valve member 50 is a cylinder or capsule 70. There is a narrow peripheral water passage 72 between the outside of capsule 70 and the interior of the valve member 50, to permit water from the mixing chamber of the valve to pass upwardly through a passage 74 and into water chamber 58.

The capsule 70 may have a passage or opening 76 at its upper end and may have a peripheral bead or the like 78 below the passage 76. That portion of the capsule below the bead 78 may have a hexagonal cross section or any other satisfactory shape, providing it is not completely round. Positioned within and movable within the capsule 70 is a piston 80 which has the same exterior shape as the portion of capsule 70 below the bead 78. The piston 80 may have a seal ring 82 which bears against the interior wall of the capsule 70. A screw 84 extends into the capsule 70, and may be operated by an Allen wrench 85, or the like, which has an operating handle 86 extending outside of the valve. The wrench 85 extends into tool receiving opening 88 in the screw 84. The bottom of screw 84 has a head 90 which holds the screw in place and permits it to rotate but not move axially. The interior surface of the piston 80 is threaded to match the exterior of the screw 84 with the result that as the screw 84 is turned, piston 80 will move up and down within capsule 70.

Movement of the piston 80 in an upward direction is effective to force lubricant, which is within the capsule 70, out of the passage 76 into the space about the exterior of the capsule 70 and then through passage 92 to a position where the grease or lubricant can be applied to seal rings 56 and 62.

Figure 5:
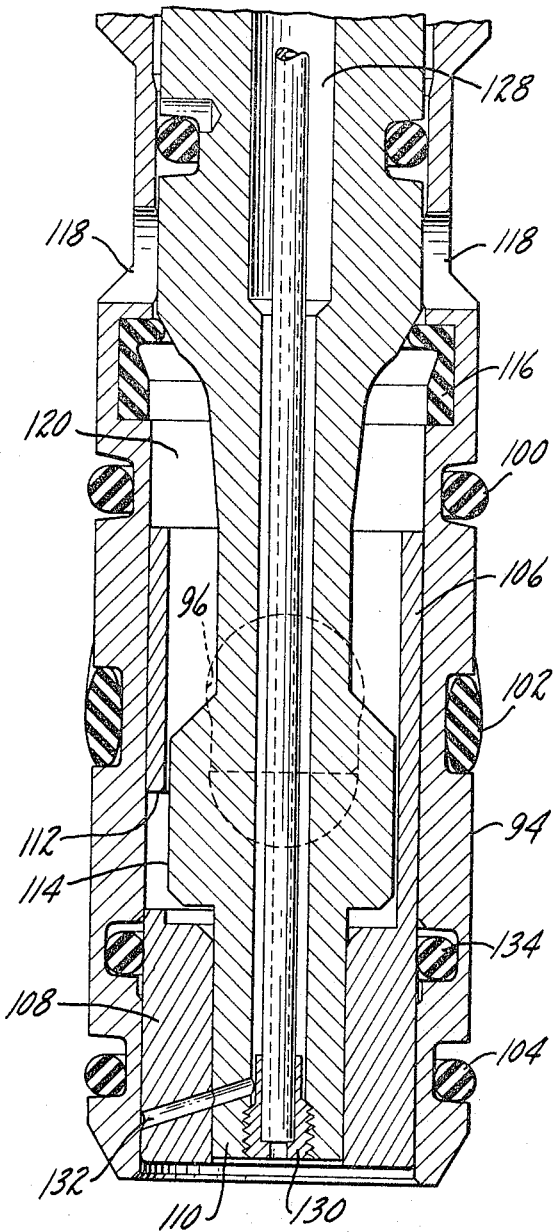

FIGURES 4 and 5 show a second form of cartridge or valve which can utilize a greasing arrangement of the type described above. FIGURE 4 shows the top of the cartridge and FIGURE 5 shows the bottom. An outer sleeve 94 has hot and cold water inlet ports, one of which is indicated at 96. O-rings 98, 100, 102 and 104 are positioned at various points along the outside of the sleeve 94. Within the sleeve 94 is a valve member 106 having a lower cylindrical portion 108 fixed to a central stem 110. A slot or the like 112 may be formed in the valve member 106 and is positioned in general alignment with the inlet ports 96 when the valve is in the open position. A vane or the like 114, forming a part of the stem, may be used to block crossflow between the inlet and outlet ports when the valve is in the on position. A seal member 116 blocks off outlet ports 118, generally at the center of the valve when the valve is in the closed position of FIGURE 5. When the valve is raised to the open position, water can flow from the inlet ports, through slot 112 to chamber 120. From chamber 120, which surrounds the stem 110, the water flows out of the outlet ports 118. Reciprocation of the stem and valve member controls the volume of water being discharged and rotation of the stem controls the temperature of the water being discharged.

The upper end of the stem 110 has a bore 122 into which is threaded a hollow screw 124. The bottom of screw 124 bears against an O-ring 126 which forms the upper end of a grease chamber 128. The lower end of the grease chamber 128 is sealed by a vent plug 130. A grease passage 132 passes through the stem and the valve member to provide an access opening for grease from chamber 128 to reach the exterior surface of the valve member to provide grease for O-ring 134. An Allen wrench or the like 136 may extend into the hollow center 138 of sleeve 124 and is in engagement with a tool engaging surface 140 at the upper end of the screw 142. Rotation of wrench 136 is effective to rotate the screw to force O-ring 126 downward and push grease out of grease chamber 128.

The use, operation and function of the invention are as follows:

Valves of the type shown and described herein have seal rings between the valve outer sleeve and the movable valve member. In order for the valve member to be easily manipulated for control of the water temperature and volume, these seal rings should be lubricated. Although the valves are lubricated at the factory, it is desirable to relubricate the seal rings at periodic intervals during the normal life of the valve. The present invention provides a source of lubrication built into the valve and means outside of the valve for periodically applying lubrication from the source to the seal rings in question.

Specifically considering the invention as shown in FIGURE 3, lubricant is contained within the capsule 70. Rotation of handle 86 of the wrench 85 is effective to move the piston 80 in an upward direction to force lubricant out of passage 76, through port or passage 92, to a position where the lubricant may be applied to seal rings 56 and 62. The manipulation of the wrench 85 can be accomplished by the homeowner, and thus it is not necessary to call a plumber. The wrench may be a part of the faucet assembly as installed, for example, it may extend through the screw holding the handle to the cartridge. At periodic intervals, for example six months or the like, the protective cap on the faucet handle is removed and the wrench is given one or more turns, sufficient to supply an appropriate amount of lubricant. With such a supply of lubricant within the valve, the faucet assembly should operate satisfactorily without replacement for a period of many years.

The structure of FIGURES 4 and 5 operates similarly in that turning of wrench 136 is effective to move screw 142 down to force grease out of the chamber and through port 132 to the exterior of the valve member where it may contact seal ring 134.

The invention should not be limited to a valve of the cartridge type, as the invention has broad application to any water faucet assembly in which there are seal rings or sealing members which need lubrication for proper valve operation.

Similarly, the invention should not be limited to any particular means for withdrawing lubricant from the source. Any means that can be periodically operated by the homeowner from the exterior of the valve without disassembly, and which will not cause accidental loss of lubricant, is satisfactory.

Whereas the preferred form of the invention has been shown and described herein, it should be realized that there are many modifications, substitutions and alterations thereto within the scope of the following claims.

We claim:
1. In a hot and cold water faucet type mixing valve,
  a valve housing having an inlet and an outlet,
  a valve member within the housing,
  said valve member being movable with respect to the housing from a first position in which it blocks communication between the inlet and outlet, to a second position in which it forms, with the valve housing, a fluid flow path from the inlet to the outlet,
  said fluid flow path being formed, for at least a portion of the length, exteriorly of the valve member,
  a sealing member between the valve housing and the valve member, and
  means for lubricating the sealing member, said means including
  a lubricant chamber contained within, and movable with, the valve member
  a lubricant passageway between the lubricant chamber and the low pressure side of the sealing member,
  said lubricant passageway terminating at a sliding surface between the valve member and the valve housing,
  a piston within the lubricant chamber,
  said piston being disposed about, and movable along, a guide structure,
  said guide structure being disposed within the lubricant chamber and passing through said piston,
  exteriorly operated means for moving the piston axially along the guide structure to thereby force lubricant from the chamber whereby, upon operation of the exteriorly operating means, said piston will move lubricant into the lubricant passageway.

2. The combination of claim 1 further characterized in that
  the piston has a non-circular shape, and the lubricant chamber has complementary contoured surfaces in the portion thereof containing said piston whereby the piston may move linearly, but not rotatably, as it moves along the guide structure.

3. The combination of claim 1 further characterized in that,
  the piston has a substantially circular periphery, and the lubricant chamber has a complementary contoured surface in the portion thereof containing said piston whereby the piston may rotate as it moves linearly along the guide structure.

References Cited

UNITED STATES PATENTS

| | | | |
|---|---|---|---|
| 1,145,271 | 7/1915 | Scanlan | 137—625.41 |
| 1,291,566 | 1/1919 | Lewis | 137—625.41 |
| 1,258,723 | 3/1918 | Tyden | 184—38 |
| 2,038,889 | 4/1936 | Clade | 184—38 X |
| 2,086,946 | 7/1937 | Rick | 184—38 X |
| 3,103,231 | 9/1963 | Moen | 137—625.4 X |

LAVERNE D. GEIGER, *Primary Examiner.*

E. J. EARLS, *Assistant Examiner.*